(12) United States Patent
Min et al.

(10) Patent No.: US 11,258,081 B2
(45) Date of Patent: Feb. 22, 2022

(54) FUEL CELL HYDROGEN SUPPLY FAULT DIAGNOSIS SYSTEM AND METHOD

(71) Applicants: Hyundai Motor Company, Seoul (KR); Kia Motors Corporation, Seoul (KR)

(72) Inventors: Boung Ho Min, Gyeonggi-do (KR); Dong Hun Lee, Gyeonggi-do (KR); Soon Woo Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 77 days.

(21) Appl. No.: 16/365,296

(22) Filed: Mar. 26, 2019

(65) Prior Publication Data

US 2020/0119378 A1  Apr. 16, 2020

(30) Foreign Application Priority Data

Oct. 15, 2018 (KR) .................. 10-2018-0122670

(51) Int. Cl.
*H01M 8/0444* (2016.01)
*H01M 8/0438* (2016.01)
*H01M 8/04664* (2016.01)
*H01M 8/04223* (2016.01)

(52) U.S. Cl.
CPC ... *H01M 8/04462* (2013.01); *H01M 8/04231* (2013.01); *H01M 8/04432* (2013.01); *H01M 8/04679* (2013.01); *H01M 2250/20* (2013.01)

(58) Field of Classification Search
CPC ............. H01M 8/0444; H01M 8/0438; H01M 8/04664; H01M 8/04223
See application file for complete search history.

(56) References Cited

U.S. PATENT DOCUMENTS

| 2010/0040922 A1* | 2/2010 | Katano | ............. H01M 8/04201 429/423 |
| 2011/0087441 A1* | 4/2011 | Salvador | ........... H01M 8/04225 702/24 |

FOREIGN PATENT DOCUMENTS

| JP | 2003-308865 A | * 10/2003 | .............. H01M 8/04 |
| KR | 10-0815308 B1 | 3/2008 | |
| KR | 10-0837933 B1 | 6/2008 | |
| KR | 10-1393581 B1 | 5/2014 | |
| KR | 101459815 B1 | 11/2014 | |
| KR | 101714128 B1 | 3/2017 | |
| KR | 10-1836649 B1 | 3/2018 | |

* cited by examiner

*Primary Examiner* — Osei K Amponsah
(74) *Attorney, Agent, or Firm* — Mintz Levin Cohn Ferris Glovsky and Popeo, P.C.; Peter F. Corless

(57) ABSTRACT

A fuel cell hydrogen supply fault diagnosis system is provided. The system includes multiple fuel tanks that store hydrogen therein to supply the hydrogen and a fuel tank valve disposed at each of the fuel tanks and configured to be opened or closed to supply or shut off the hydrogen of the fuel tanks. A pressure sensor measures pressure in a fuel supply line that extends from each of the multiple fuel tanks to be integrally connected to a fuel cell stack. A supply amount estimator then estimates a supply amount of hydrogen supplied to the fuel cell stack and a consumption amount estimator estimates a consumption amount of hydrogen consumed in a reaction in the fuel cell stack or discharged therefrom. A fault detector then detects a hydrogen supply state.

9 Claims, 3 Drawing Sheets

FUEL CELL HYDROGEN SUPPLY FAULT DIAGNOSIS SYSTEM AND METHOD

CROSS REFERENCE TO RELATED APPLICATION

The present application claims priority to Korean Patent Application No. 10-2018-0122670, filed Oct. 15, 2018, the entire contents of which is incorporated herein for all purposes by this reference.

BACKGROUND

Field of the Invention

The present invention relates generally to fuel cell hydrogen supply fault diagnosis system and method, wherein a hydrogen leak of the fuel cell or operational failure of a fuel tank valve is diagnosed.

Description of the Related Art

As well known in the art, a fuel cell converts chemical energy generated by oxidation of fuel directly into electric energy and is a type of power generation device. The fuel cell is fundamentally the same as a chemical cell in use of oxidation and reduction reactions, but differs from the chemical cell where cell reactions take place in a closed system in that reactants are continuously supplied from the outside and a reaction product is continuously removed from the system. In recent years, a fuel cell power generation system has been developed. Since the reaction product of the fuel cell is pure water, research for using the fuel cell as an energy source of an environmentally friendly vehicle has been actively conducted.

FIG. 1 is a block diagram showing a fuel cell system according the related art. Referring to FIG. 1, the fuel cell system according to the related art includes a cooling system 20, an air supply system 30, and a hydrogen supply system 40 which supplies coolant, air, and hydrogen, respectively, to a fuel cell stack 10. In particular, the hydrogen supply system 40 receives hydrogen from a fuel tank 70 in which hydrogen is stored, supplies hydrogen to the anode side of the fuel cell stack 10, and recycles hydrogen.

In the related art, hydrogen detection sensors 50 and 60 configured to detect a hydrogen leak are respectively disposed proximate to an ejector 41, which receives hydrogen from the fuel tank 70 to supply hydrogen to the anode side of the fuel cell stack 10 and recirculates hydrogen discharged from the anode side, and the fuel cell stack 10. However, mounting of the hydrogen detection sensors 50 and 60 is costly, and the hydrogen detection sensors 50 and 60 have been observed to fail frequently and therefore, reliability thereof and hydrogen detect is poor.

Furthermore, when the fuel tank 70 is divided into multiple parts to increase the usable area of an internal space or the like, when any one or more of respective fuel tank valves 71 provided at the multiple fuel tanks 70 operationally fail, the fuel amount or available driving distance of a vehicle is reduced but a pressure sensor 72 disposed at an integrated position from the fuel tank 70 fails to detect the operational failure.

The foregoing is intended merely to aid in the understanding of the background of the present invention, and is not intended to mean that the present invention falls within the purview of the related art that is already known to those skilled in the art.

SUMMARY

Accordingly, the present invention provides a technique of diagnosing a hydrogen supply state by comparing a supply amount of hydrogen supplied from a fuel tank and a consumption amount of hydrogen according to an anode side concentration estimated by a concentration estimator.

In order to achieve the above objective, according to one aspect of the present invention, a fuel cell hydrogen supply fault diagnosis system may include: multiple fuel tanks in which hydrogen is stored; a fuel tank valve disposed at each of the fuel tanks and configured to be opened or closed to supply or shut off the hydrogen of the fuel tanks; a pressure sensor configured to measure pressure in a fuel supply line that extends from each of the multiple fuel tanks to be integrally connected to a fuel cell stack a supply amount estimator configured to estimate a supply amount of hydrogen supplied to the fuel cell stack based on the pressure in the fuel supply line measured by the pressure sensor; a consumption amount estimator configured to estimate a consumption amount of hydrogen consumed in a reaction in the fuel cell stack or discharged therefrom; and a fault detector configured to detect a hydrogen supply state based on the supply amount of hydrogen estimated by the supply amount estimator and the consumption amount of hydrogen estimated by the consumption amount estimator. The supply amount estimator may assume that the pressure in the fuel supply line measured by the pressure sensor when the fuel tank valves are opened is pressure in the multiple fuel tanks, thus calculating an amount of hydrogen stored in the fuel tank and estimate an amount of change in the amount of stored hydrogen as the supply amount of hydrogen.

The system may further include a concentration estimator configured to estimate, in real time, an anode side hydrogen concentration of the fuel cell stack in consideration of crossover and purge based on an initial value. The consumption amount estimator may be configured to estimate as the consumption amount of hydrogen a value obtained by adding a reaction amount consumed in the reaction in the fuel cell stack, a crossover amount crossed over from the anode side to the cathode side of the fuel cell stack, and a purge amount purged from the fuel cell stack. The crossover amount and the purge amount may be estimated cumulatively over time based on the anode side hydrogen concentration of the fuel cell stack estimated by the concentration estimator.

The fault detector, when a ratio of a difference between the supply amount of hydrogen and the consumption amount of hydrogen to the supply amount of hydrogen is equal to or greater than a failure rate predetermined to be inversely proportional to the number of fuel tanks, may be configured to detect that any one or more of the fuel tank valves have operationally failed. Additionally, the fault detector, when a ratio of a difference between the supply amount of hydrogen and the consumption amount of hydrogen to the supply amount of hydrogen is equal to or greater than a leak rate predetermined according to an operation mode of a fuel cell, may be configured to detect that a hydrogen leak has occurred. The system may further include a main controller configured to enter an emergency operation mode when the fault detector detects that the hydrogen supply state is abnormal.

According to another aspect of the present invention, a fuel cell hydrogen supply fault diagnosis method may include: opening a fuel tank valve disposed in each of the multiple fuel tanks and configured to supply or shut off hydrogen of the fuel tanks; measuring pressure in a fuel supply line that extends from each of the multiple fuel tanks to be integrally connected to a fuel cell stack; estimating a supply amount of hydrogen supplied to the fuel cell stack based on the measured pressure in the fuel supply line and estimating a consumption amount of hydrogen consumed in a reaction in the fuel cell stack or discharged therefrom; and diagnosing a hydrogen supply state based on the estimated supply amount of hydrogen and consumption amount of hydrogen.

In the estimating of the supply amount of hydrogen and the consumption amount of hydrogen, the amount of hydrogen stored in the fuel tanks may be calculated assuming that the measured pressure in the fuel supply line is pressure in the multiple fuel tanks, and an amount of change in the amount of stored hydrogen may be estimated as the supply amount of hydrogen. In addition, in the estimating of the supply amount of hydrogen and the consumption amount of hydrogen, a reaction amount consumed in the reaction in the fuel cell stack, a crossover amount cross from an anode side to a cathode side of the fuel cell stack, a purge amount purged from the fuel cell stack may be added together and a value resulting from the addition may be estimated as the consumption amount of hydrogen.

The reaction amount may be estimated by cumulating an output electric current of the fuel cell stack over time, the crossover amount and the purge amount may be cumulatively estimated over time based on an anode side hydrogen concentration of the fuel cell stack, and the anode side hydrogen concentration of the fuel cell stack may be estimated in real time in consideration of crossover and purge based on an initial value.

In diagnosing the hydrogen supply rate, when a ratio of a difference between the supply amount of hydrogen to the supply amount of hydrogen and the consumption amount of hydrogen is equal to or greater than a failure rate predetermined to be inversely proportional to the number of the fuel tanks, any one or more of the fuel tank valves may be detected to have operationally failed. Additionally, in diagnosing the hydrogen supply rate, in response to detecting that any one or more of the fuel tank valves have operationally failed, which of the fuel tank valves that has operationally failed may be determined by independently operating the fuel tank valves.

The method may further include, after diagnosing the hydrogen supply state, in response to detecting that any one or more of the fuel tank valves have operationally failed, correcting a fuel fill amount or an available driving distance based on the number of fuel tank valves detected as having operationally failed and entering an emergency operation mode. The emergency operation mode may be entered to determine which fuel tank valve has operationally failed by independently operating the fuel tank valves. In addition, when a ratio of a difference between the supply amount of hydrogen and the consumption amount of hydrogen to the supply amount of hydrogen is equal to or greater than a leak rate predetermined according to an operation mode of a fuel cell, a hydrogen leak may be detected.

When the operation mode of the fuel cell is a power generation mode in which the fuel cell stack generates an electric current, the leak rate may be predetermined as a first rate. When the operation mode of the fuel cell is an initial mode within a predetermined interval from a point at which hydrogen supply to the fuel cell stack begins, the leak rate may be predetermined as a second rate that is greater than the first rate. When the operation mode of the fuel cell is a high output mode in which the fuel cell stack generates an electric current equal to or greater than a predetermined electric current, the leak rate may be predetermined as a third rate that is less than the first rate. When the ratio of the difference between the supply amount of hydrogen and the consumption amount of hydrogen to the supply amount of hydrogen is equal to or greater than the third rate, the hydrogen leak may be determined to be insignificant.

The method may further include, after diagnosing the hydrogen supply state, in response to detecting a hydrogen leak, entering an emergency operation mode. The emergency operation mode may limit a load of the fuel cell or increase regenerative braking of a motor connected to the fuel cell.

According to the fuel cell hydrogen supply fault diagnosis system and method according to the present invention, it may be possible to achieve more accurate detection of the hydrogen leak without requiring provision of any separate hydrogen detection sensor. Furthermore, the leakage rate is variable according to the operation mode of the fuel cell, and more accurate detection of the hydrogen leak may be achieved depending on the situation. In addition, it may be possible to detect operational failure of any one or more of the fuel tank valves. In response to detecting that hydrogen supply is abnormal, the fuel cell may be operated in the emergency operation mode, thus making it possible to ensure reliability.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
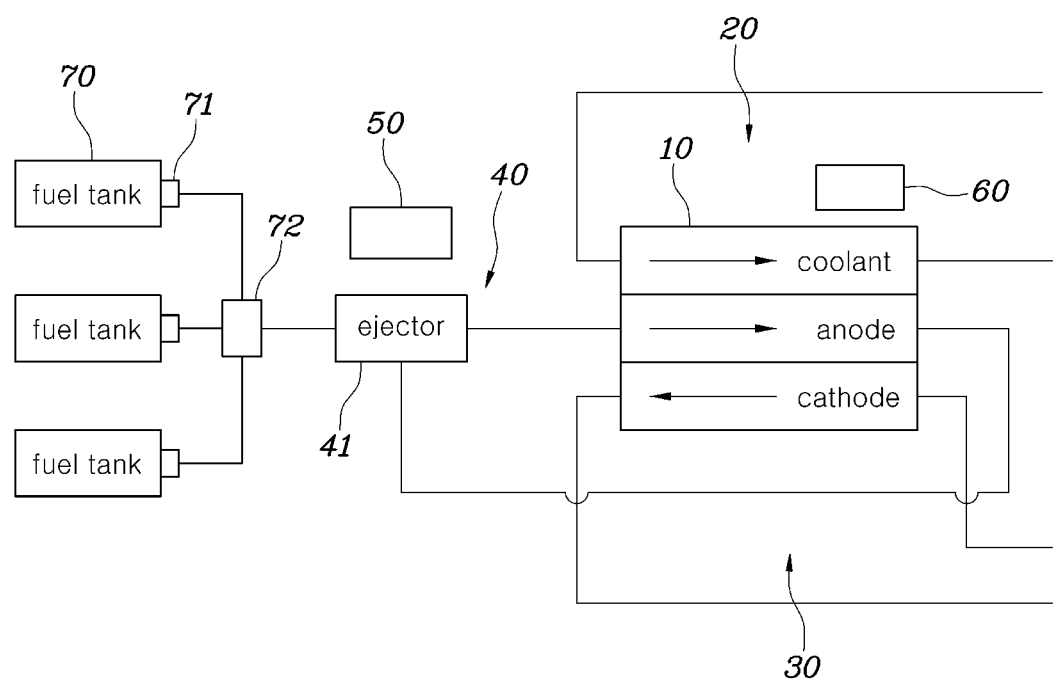
FIG. 1 is a view showing a fuel cell system according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Specific structural and functional descriptions of exemplary embodiments of the present invention disclosed herein are only for illustrative purposes of the exemplary embodiments of the present invention. The present invention may be embodied in many different forms without departing from the spirit and significant characteristics of the present invention. Therefore, the exemplary embodiments of the present invention are disclosed only for illustrative purposes and should not be construed as limiting the present invention.

Reference will now be made in detail to various exemplary embodiments of the present invention, specific examples of which are illustrated in the accompanying drawings and described below, since the exemplary, embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Hereinbelow, exemplary embodiments of the present invention will be described in detail with reference to the accompanying drawings. Throughout the drawings, the same reference numerals will refer to the same or like parts.

Figure 2:
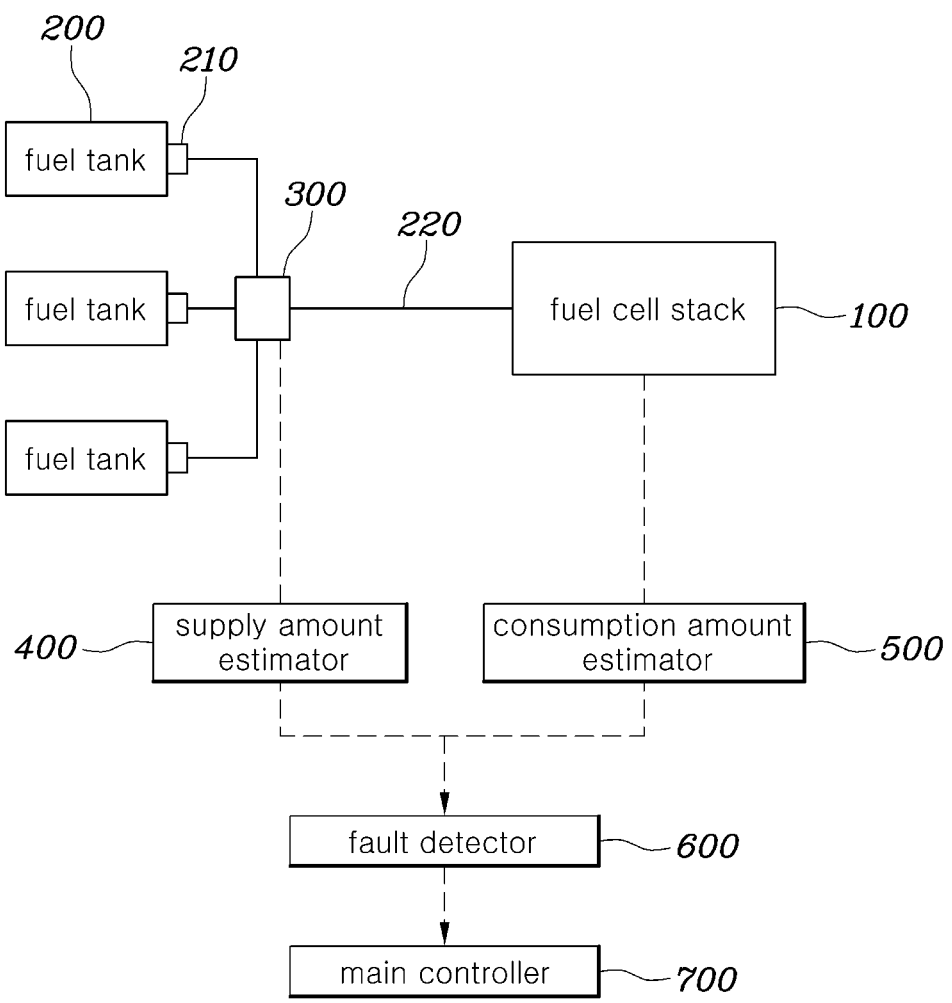
FIG. 2 is a view showing a configuration of a fuel cell hydrogen supply fault diagnosis system according to an exemplary embodiment of the present invention.

FIG. 2 is a view showing a configuration of a fuel cell hydrogen supply fault diagnosis system according to an exemplary embodiment of the present invention. Referring to FIG. 2, the fuel cell hydrogen supply fault diagnosis system according to the exemplary embodiment of the present invention may include: multiple fuel tanks 200 that stores hydrogen; a fuel tank valve 210 disposed at each of the fuel tanks 200 and configured to be opened or closed to supply or shut off the hydrogen of the fuel tanks 200; a pressure sensor 300 configured to measure pressure in a fuel supply line 220 that extends from each of the multiple fuel tanks 200 to be integrally connected to a fuel cell stack 100; a supply amount estimator 400 configured to estimate a supply amount of hydrogen supplied to the fuel cell stack 100 based on the pressure in the fuel supply line 220 measured by the pressure sensor 300; a consumption amount estimator 500 configured to estimate a consumption amount of hydrogen consumed in a reaction in the fuel cell stack 100 or discharged therefrom; and a fault detector 600 configured to detect (e.g., diagnose) a hydrogen supply state based on the supply amount of hydrogen estimated by the supply amount estimator 400 and the consumption amount of hydrogen estimated by the consumption amount estimator 500. A controller of the system may be configured to operate the components described above.

The fuel cell stack 100 generates electricity through chemical reactions between hydrogen supplied to an anode side and air supplied to a cathode side. In particular, hydrogen supplied to the fuel cell stack 100 may be recirculated to be supplied back to the fuel cell stack 100, while hydrogen stored in the fuel tanks 200 is supplied thereto. In particular, the fuel tank 200 may store hydrogen therein and may supply the hydrogen to the fuel cell stack 100. The fuel tank 200 may be provided as at least two multiple fuel tanks due to a limited mounting space or the like within a vehicle. The multiple fuel tanks 200 may be connected to the fuel cell stack 100 via the fuel supply line 220 being a single integrated line.

Each of the multiple fuel tanks 200 may include the fuel tank valve 210 configured to be opened or closed to supply or shut off hydrogen in the fuel tank 200 to the fuel supply line 220. The fuel tank valve 210 may be opened and closed in response to a start-on signal and a start-off signal of a fuel cell system or a fuel cell vehicle, respectively. The supply amount estimator 400 may be configured to estimate the supply amount of hydrogen supplied to the fuel cell stack 100 using the pressure in the fuel supply line 220. A method of estimating the specific supply amount of hydrogen will be described later.

The consumption amount estimator 500 may be configured to estimate the consumption amount of hydrogen consumed in the reaction in the fuel cell stack 100 or discharged therefrom. In particular, the consumption amount of hydrogen may be estimated by adding the amount of hydrogen consumed for electricity generation through the reaction in the fuel cell stack 100 and the amount of hydrogen discharged without being consumed for electricity generation.

Additionally, the fault detector 600 may be configured to diagnose or detect the hydrogen supply state based on the supply amount of hydrogen estimated by the supply amount estimator 400 and the consumption amount of hydrogen estimated by the consumption amount estimator 500. The supply amount of hydrogen and the consumption amount of hydrogen should be the same. However, when there is a substantial difference between the supply amount of hydrogen and the consumption amount of hydrogen, a hydrogen leak may be detected or a failure in hydrogen supply may be detected.

The pressure sensor 300 may be positioned on the fuel supply line 220 and may be configured to measure or detect a supply pressure of hydrogen in a state of being combined from the multiple fuel tanks 200. Accordingly, even when only any one of the fuel tank valves 210 are opened, there is no change in value of the measured pressure of the pressure sensor 300, leading to a problem in that any one of the fuel tank valves 210 are not opened, and which was impossible to detect in the related art.

However, according to the present invention, it may be possible to diagnose a phenomenon where any one or more of the fuel tank valves 210 are not opened despite transmission of an open command signal and to achieve more accurate detection of the hydrogen leak without requiring use of any separate hydrogen sensor. The supply amount estimator 400 may assume that the pressure in the fuel supply line 220 measured by the pressure sensor 300 when the fuel tank valves 210 are opened is pressure in the multiple fuel tanks 200, thus calculating the amount of hydrogen stored in the fuel tank 200 and may be configured to estimate the amount of change in the amount of stored hydrogen as the supply amount of hydrogen.

Furthermore, the present invention may further include a concentration estimator configured to estimate, in real time, an anode side hydrogen concentration of the fuel cell stack 100 in consideration of crossover and purge based on an initial value. The consumption amount estimator 500 may be configured to estimate, as the consumption amount of hydrogen, a value obtained by adding a reaction amount consumed in the reaction in the fuel cell stack 100, a crossover amount crossed over from the anode side to the cathode side of the fuel cell stack 100, and a purge amount purged from the fuel cell stack 100. The crossover amount and the purge amount may be estimated cumulatively over time based on the anode side hydrogen concentration of the fuel cell stack 100 estimated by the concentration estimator.

When a ratio of a difference between the supply amount of hydrogen and the consumption amount of hydrogen to the supply amount of hydrogen is equal to or greater than a failure rate predetermined to be inversely proportional to the number of fuel tanks 200, the fault detector 600 may be configured to detect that any one or more of the fuel tank valves 210 have operationally failed. Additionally, when the ratio of the difference between the supply amount of hydrogen and the consumption amount of hydrogen to the supply amount of hydrogen is equal to or greater than a leak rate predetermined according to an operation mode of a fuel cell, the fault detector 600 may be configured to detect the occurrence of a hydrogen leak.

The present invention may further include a main controller 700. The main controller 700 may be configured to cause the system to enter an emergency operation mode when the fault detector 600 detects that the hydrogen supply state is abnormal. In other words, the fault detector 600 may be configured to detect that the hydrogen supply state is abnormal, and in response, the main controller 700 may be configured to enter the emergency operation mode, thus safely stopping the operation of the fuel cell for inspection. For example, the main controller 700 may be a fuel cell vehicle controller (FCU). The supply amount estimator 400, the consumption amount estimator 500, and the fault detector 600 may also be the FCU or a separately provided sub-controller.

Figure 3:
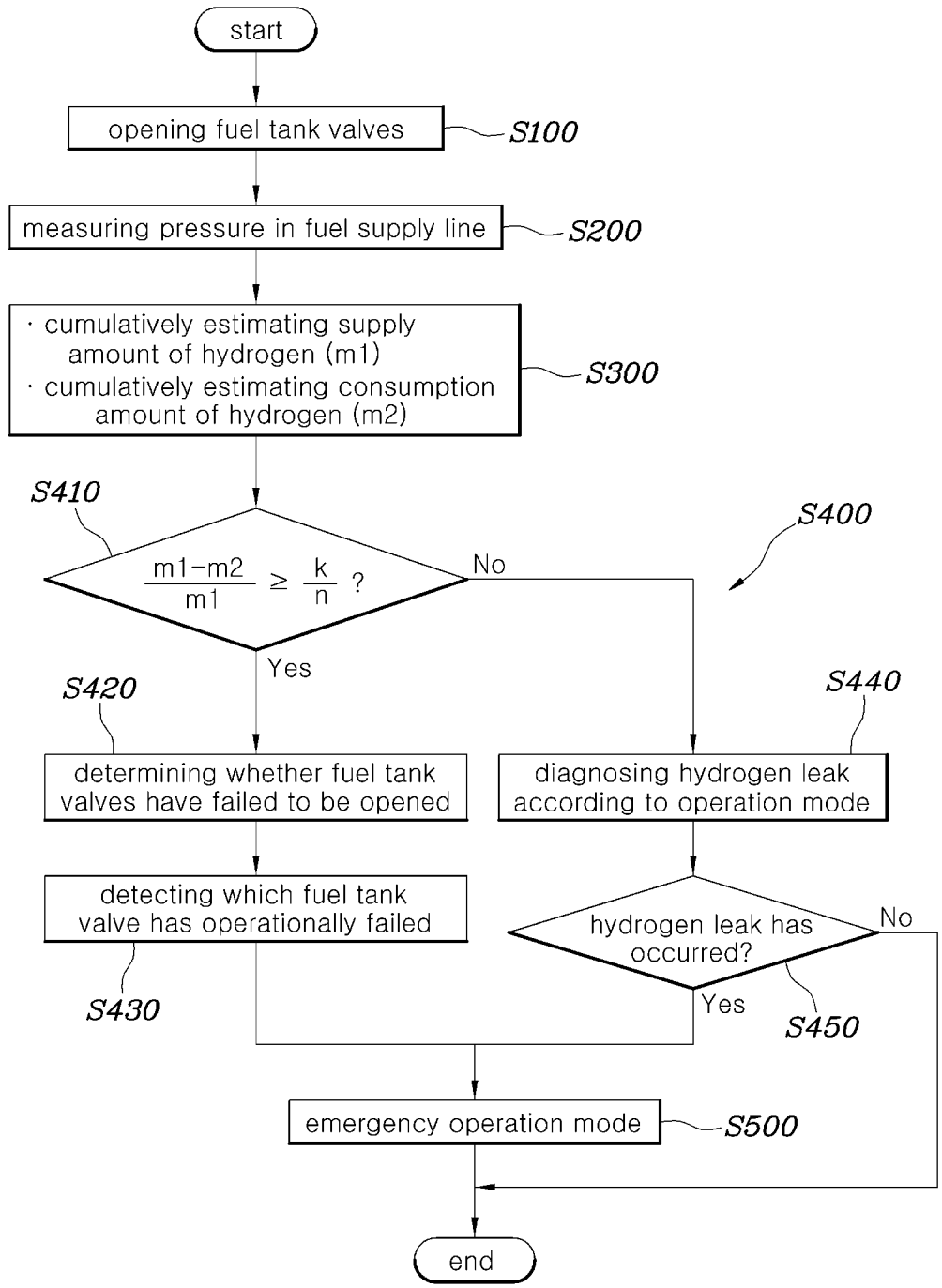
FIG. 3 is a flowchart showing a fuel cell hydrogen supply fault diagnosis method according to an exemplary embodiment of the present invention.

A control method thereof will be described in detail below. FIG. 3 is a flowchart showing a fuel cell hydrogen supply fault diagnosis method according to an exemplary embodiment of the present invention. The method described herein below may be executed by the main controller 700. Referring to FIG. 3, the fuel cell hydrogen supply fault diagnosis method according to the exemplary embodiment of the present invention may include: opening a fuel tank valve provided in each of the multiple fuel tanks and configured to supply or shut off hydrogen of the fuel tanks (S100); measuring pressure in a fuel supply line that extends from each of the multiple fuel tanks to be integrally connected to a fuel cell stack (S200); estimating a supply amount of hydrogen supplied to the fuel cell stack based on the measured pressure in the fuel supply line and estimating a consumption amount of hydrogen consumed in a reaction in the fuel cell stack or discharged therefrom (S300); and diagnosing (detecting) a hydrogen supply state based on the estimated supply amount of hydrogen and consumption amount of hydrogen (S400).

In the opening of the fuel tank valve (S100), all respective fuel tank valves disposed at the multiple fuel tanks may be opened. When the start of a fuel cell or a vehicle equipped with the fuel cell is turned on, the fuel tank valves may be opened. In the measuring of pressure in the fuel supply line (S200), the pressure in the fuel supply line may be measured by a pressure sensor. The fuel supply line may extend from each of the multiple tanks to be integrally connected to the fuel cell stack, and the pressure in the fuel supply line measured by the pressure sensor may be assumed to be the same as the pressure in the multiple fuel tanks.

In the estimating of the supply amount of hydrogen m1 and the consumption amount of hydrogen m2 (S300), the supply amount of hydrogen m1 supplied from the fuel tanks and the consumption amount of hydrogen m2 consumed in the fuel cell stack may be estimated individually. In detecting the hydrogen supply state (S400), whether the hydrogen supply state is abnormal may be detected using a difference between the estimated supply amount of hydrogen and consumption amount of hydrogen. Accordingly, a more accurate detection of the hydrogen leak may be achieved without requiring any separate hydrogen detection sensor.

Furthermore, the diagnosis method described above enables even detection of operational failure of any one or more of the fuel tank valves, which is advantageous over the related art in which operational failure of any one or more of the fuel tank valves are not detected while only a case where all of the fuel tank valves have operationally failed is detected. In particular, in estimating the supply amount of hydrogen m1 and the consumption amount of hydrogen m2 (S300), the amount of hydrogen stored in the fuel tanks may be calculated assuming that the measured pressure in the fuel supply line is the pressure in the multiple fuel tanks, and the amount of change in the amount of stored hydrogen is estimated as the supply amount of hydrogen.

When the fuel tank valves are all opened in opening the fuel tank valve (S100), the pressure in the fuel supply line will be the same as the pressure in the multiple fuel tanks. Accordingly, it may be possible to measure the pressure in the multiple fuel tanks using only one pressure sensor positioned on the fuel supply line. In particular, a method of estimating the supply amount of hydrogen may be estimated using the van der Waals equation of state. The van der Waals equation of state is as follows:

$$P = \frac{RT}{V-b} - \frac{a}{V^2}$$

wherein P is the pressure of gas, V is the volume per mole of gas, T is the absolute temperature, and a and b are the van der Waals constants according to the type of gas. For hydrogen, a=0.244, and b=0.0266.

$$\rho = \frac{2.01588}{V \times 1000} \quad [g-l]$$

wherein $\rho$ is the density of hydrogen [g/l], and 2.01588 is the molecular weight of hydrogen. The density of hydrogen may be calculated by substituting V calculated by the above equation $$m1 = \frac{V_t \times \rho}{1000}$$

wherein m1 is a supply amount of hydrogen [g], and $V_t$ is the volume of the tanks [m^3]. The supply amount of hydrogen m1 may be estimated by the above equation.

In estimating the supply amount of hydrogen m1 and the consumption amount of hydrogen m2 (S300), a reaction amount consumed in the reaction in the fuel cell stack, a crossover amount crossed over from an anode side to a cathode side of the fuel cell stack, a purge amount purged from the fuel cell stack may be added together and a value resulting from addition may be estimated as the consumption amount of hydrogen. In other words, the calculation equation may be as follows:

{Consumption amount of hydrogen m2=reaction amount+crossover amount+purge amount}

The reaction amount may be estimated by cumulating an output electric current of the fuel cell stack over time. As the output electric current of the fuel cell stack is cumulated over time, the reaction amount of hydrogen according to the cumulated output electric current may be estimated.

Furthermore, the crossover amount and the purge amount may be cumulatively estimated over time based on an anode side hydrogen concentration of the fuel cell stack. The anode side hydrogen concentration of the fuel cell stack may be a value estimated by a concentration estimator in real time in consideration of crossover and purge based on an initial value. In particular, the concentration estimator may assume that gases on the anode side of the fuel cell includes only hydrogen, nitrogen, and vapor. Some remaining gases may be included, but the amount thereof will be negligible and may thus be ignored. The initial value may be predicted based on a previously estimated gas concentration Upon the restart of the fuel cell, an initial amount of gas may be predicted using fuel cell stop time data or fuel cell current state data.

The amount of hydrogen $n_{H_2}$ on the anode side may be calculated by subtracting the amount of nitrogen $n_{H_2}$ and the amount of vapor $n_V$ from a total amount of gas on the anode side $n_{An}$ as shown in the following equation.

$$n_{H_2} = n_{An} - n_{N_2} - n_V$$

The total amount of gas on the anode side $n_{An}$ may be estimated using a total gas pressure P on the anode side, the volume V, and the temperature T as shown in the following equation.

$$n_{An} = \frac{P_{An} V_{an}}{RT} \quad [mol]$$

wherein R is the gas constant (8.314 [J/mol·K]).

The amount of nitrogen ($n_{H_2}$) and the amount of vapor ($n_V$) on the anode side may be calculated in consideration of crossover and purge based on the initial amount as shown in the following equations.

$$n_{H_2} = n_{N_2\text{-}init} + \int (\dot{n}_{N_2\text{-}XO} - \dot{n}_{N_2\text{-}purge}) dt$$

$$n_V = n_{V\text{-}init} + \int (\dot{n}_{V\text{-}XO} - \dot{n}_{V\text{-}purge}) dt$$

The crossover amount of gas may be calculated using the following FICK's LAW (of diffusion).

$$\frac{\dot{m}}{A} = -D \frac{\partial c}{\partial x} = -D \frac{M}{RT} \frac{\partial P}{\partial x}$$

wherein $\dot{m}$ is the rate of mass diffusion of gas (g/s), A is the area over which diffusion takes place, D is the diffusion coefficient of gas, x is the diffusion length, c is the concentration of gas, R is the universal gas constant (8.314 J/mol·K), P is the pressure of gas, T is the temperature of gas, and M is the molar mass of gas (g/mol).

This may be summarized as follows.

$$\dot{m} = -D \frac{M}{RT} \frac{\partial P}{\partial x} A = \dot{n} \cdot M$$

$$\dot{n} = -D \frac{1}{RT} \frac{\partial P}{\partial x} A$$

wherein $\dot{n}$ is the rate of diffusion of gas (mol/s).

Thus, the crossover amount of gas through an electrolyte membrane of the fuel cell stack 100 may be calculated using the following equation.

$$\dot{n}_{N2\_xo} = \frac{D_{N2}}{RT} \frac{P_{Ca,N2} - P_{An,N2}}{\delta} A$$

Herein, the symbols used in the equation are as follows.

$\dot{n}_{N2\_xo}$, rate of diffusion of nitrogen, P: pressure, [kPa], R: gas constant, 8.314 [J/mol/K], T: temperature, [K], D: diffusion coefficient, A: area of the electrolyte membrane, $\delta$: thickness of the electrolyte membrane, $P_{Ca,N2}$: nitrogen partial pressure on the cathode side of the fuel cell, and $P_{An,N2}$: nitrogen partial pressure on the anode side of the fuel cell.

$$\dot{n}_{V\_xo} = \frac{D_V}{RT} \frac{P_{Ca,V} - P_{An,V}}{\delta} A$$

Herein, the symbols used in the equation are as follows.

$\dot{n}_{V\_xo}$: rate of diffusion of vapor, P: pressure, [kPa], R: gas constant, 8.314 [J/mol/K], T: temperature, K diffusion coefficient, A: area of the electrolyte membrane, $\delta$: thickness of the electrolyte membrane, $P_{Ca,V}$: vapor partial pressure on the cathode side of the fuel cell, and $P_{An,V}$: vapor partial pressure on the anode side of the fuel cell.

The total gas purge rate $\dot{n}_{purge}$ may be proportional to a pressure difference between gas pressure on the anode side $P_{An}$ and outside gas pressure $P_{out}$. The external gas pressure $P_{out}$ may be the gas pressure on the cathode side. The specific equation may be as follows.

$$\dot{n}_{purge} = C(P_{An} - P_{out})$$

wherein C is a fuzzy gain value and may be a value determined by a purge cycle, an opening ratio of a purge valve upon purging, an opening time of the purge valve, and the like.

The nitrogen purge rate $\dot{n}_{N2\_purge}$ and the vapor purge rate $\dot{n}_{V\_purge}$ may be calculated using the following equation.

$$\dot{n}_{N2\_purge} = \dot{n}_{purge} \cdot \frac{n_{N2}}{n_{An}}$$

$$\dot{n}_{V\_purge} = \dot{n}_{purge} \cdot \frac{n_V}{n_{An}}$$

Accordingly, a present amount of nitrogen $n_{N_2}$ and a present amount of vapor $n_V$ on the anode side may be calculated and subtracted from the total amount of gas on the anode side $n_{An}$ to calculate a present amount of hydrogen $n_{H_2}$ on the anode side, thus estimating a present concentration of hydrogen $$\frac{n_{H2}}{n_{An}}.$$

$$\frac{n_{H2}}{n_{An}} = 1 - \frac{n_{N2}}{n_{An}} - \frac{n_V}{n_{An}}$$

Hydrogen may be crossed over from the anode side to the cathode side of the fuel cell.

$$\dot{n}_{H2\_xo} = \frac{D_{H2}}{RT} \frac{P_{An,H2} - P_{Ca,H2}}{\delta} A$$

$\dot{n}_{H2\_xo}$: rate of diffusion of hydrogen, P: pressure, [kPa], R: gas constant, 8.314 [J/mol/K], T: temperature, [K], D: diffusion coefficient, A: area of the electrolyte membrane, δ: thickness of the electrolyte membrane, $P_{An,H2}$: hydrogen partial pressure on the anode side, and $P_{Ca,H2}$: hydrogen partial pressure on the cathode side.

Furthermore, the hydrogen purge rate $\dot{n}_{H2\_purge}$ may be calculated using the following equation.

$$\dot{n}_{H2\_purge} = \dot{n}_{purge} \cdot \frac{n_{H2}}{n_{An}}$$

Thus, the crossover amount and the purge amount may be cumulatively estimated over time based on the anode side hydrogen concentration of the fuel cell stack 100 as follows.

$$\int (\dot{n}_{H2xo} + \dot{n}_{H2purge}) dt$$

First, a method of diagnosing operational failure of any one or more of the fuel tank valves in diagnosing the hydrogen supply state will be described.

In diagnosing the hydrogen supply rate (S400), when a ratio of a difference between the supply amount of hydrogen to the supply amount of hydrogen and the consumption amount of hydrogen is equal to or greater than a failure rate predetermined to be inversely proportional to the number of the fuel tanks 200 (S410), any one or more of the fuel tank valves 210 may be detected to have operationally failed (S420).

Particularly, the ratio $$\frac{m1 - m2}{m1}$$

of the difference between the supply amount of hydrogen m1 and the consumption amount of hydrogen m2 to the supply amount of hydrogen m1 may be compared to the predetermined failure rate.

The predetermined failure rate is inversely proportional to the number of fuel tanks n and may be predetermined by multiplying a safety constant k in consideration of the calculation errors. The n is the number of fuel tanks assumed to be the same in size. The safety constant K is a constant considering the error that may occur due to the characteristics of the system, and the safety constant may be predetermined as a value less than 1 through appropriate experiments.

For example, assuming that there are three fuel tanks of the same size and all of the fuel tank valves are open, when the supply amount of hydrogen actually supplied to the fuel cell stack is ⅔ of the supply amount of hydrogen estimated on the basis of the pressure measured by the pressure sensor, one of the three fuel tanks may be determined to not be opened.

Accordingly, the ratio $$\frac{m1 - m2}{m1}$$

of the difference between the supply amount of hydrogen m1 and the consumption amount of hydrogen m2 to the supply amount of hydrogen m1 may be ⅓. However, in consideration of the calculation errors which may occur, the ratio may be compared to the predetermined failure rate obtained by multiplying the safety constant k less than 1. Additionally, when the ratio $$\frac{m1 - m2}{m1}$$

of the difference between the supply amount of hydrogen m1 and the consumption amount of hydrogen m2 to the supply amount of hydrogen m1 is ⅔, one of the three fuel tank valves may be determined to not be opened. Thus, the number of fuel tanks which are not opened may be determined in comparison with an integer multiple of the predetermined failure rate.

The present invention may further include, after diagnosing the hydrogen supply state (S400), in response to detecting that any one or more of the fuel tank valves have operationally failed, correcting a fuel fill amount or an available driving distance based on the number of fuel tank valves detected as having operationally failed and entering an emergency operation mode. The emergency operation mode may determine which fuel tank valve has operationally failed by independently operating the fuel tank valves (S500).

When any one or more of the fuel tank valves have operationally failed, the fuel tank having the fuel tank valve detected as having operationally failed may be maintained in a closed state. Thus, the fuel fill amount or the available driving distance must be corrected such that an actual fuel fill amount and an available driving distance according to the actual fuel fill amount are subtracted by a ratio of the fuel tank valves having operationally failed. For example, when there are three fuel tanks and one fuel tank valve has operationally failed, the actual fuel fill amount and the available driving distance according to the actual fuel fill amount may be corrected to ⅔.

Furthermore, in response to detecting that any one or more of the fuel tank valves have operationally failed (S420), which fuel tank valve has operationally failed may be determined by independently operating the multiples fuel tank valves (S430). In one exemplary embodiment, the fuel tank valves may be closed sequentially one by one in a state in which the fuel cell is being driven and which fuel tank valve has operationally failed may be determined based on the rate of pressure change measured by the pressure sensor.

Assuming that the rate of pressure change measured by the pressure sensor during operation of the fuel cell is constant, when the fuel tank valve having been normally opened is closed, the number of fuel tanks supplying hydrogen will decrease, causing the rate of pressure change measured by the pressure sensor to become rapid. Conversely, when the fuel tank valve which has not been opened despite transmission of an open command signal, there is no change in the number of fuel tanks supplying hydrogen, and the rate of pressure change measured by the pressure sensor will not be different (e.g., may remain the same).

In another exemplary embodiment, only one of the fuel tank valves may be opened while the other fuel tank valves are closed in a state in which the fuel cell is being driven. Accordingly, which fuel tank valve has operationally failed may be determined on the rate of pressure change measured by the pressure sensor. Although only one fuel tank valve is opened, when the pressure measured by the pressure sensor rapidly decreases, the corresponding fuel tank valve may be determined to have operationally failed. In particular, the pressure change is rapid, thus making it possible to enable more accurate and rapid determination.

However, all of the fuel tank valves may be shut off and thus hydrogen supply to the fuel cell stack may not be efficiently performed. In detecting the hydrogen supply state (S400), when the ratio of the difference between the supply amount of hydrogen and the consumption amount of hydrogen to the supply amount of hydrogen is equal to or greater than a leak rate predetermined according to an operation mode of the fuel cell, a hydrogen leak may be detected (S440). In other words, the supply amount of hydrogen and the consumption amount of hydrogen themselves are variable according to the operation mode of the fuel cell. Accordingly, the leak rate may be variably determined, thus achieving a more accurate diagnosis of the hydrogen leak.

Particularly, when the operation mode of the fuel cell is a power generation mode in which the fuel cell stack generates an electric current, the leak rate may be predetermined as a first rate. When the operation mode of the fuel cell is an initial mode within a predetermined interval from a point at which hydrogen supply to the fuel cell stack begins, the leak rate may be predetermined as a second rate that is greater than the first rate. The power generation mode is a state in which the fuel cell operates to generate electricity. The hydrogen leak may be detected based on whether the ratio of the difference between the supply amount of hydrogen and the consumption amount of hydrogen to the supply amount of hydrogen is equal to or greater than the predetermined first rate.

The initial mode may be within the predetermined interval from the point at which hydrogen supply to the fuel cell stack begins and may be from a hydrogen supply point to a predetermined time, a first FC stop point, or a point at which the output electric current of the fuel cell stack is equal to or greater than a reference current. At the point at which hydrogen supply to the fuel cell stack begins, the amount of purge, crossover, and the like is relatively substantial, causing a relatively large error to occur between an estimated value of the consumption amount of hydrogen and an actual value. Accordingly, the second rate may be predetermined to be greater than the first rate.

When the operation mode of the fuel cell is a high output mode in which the fuel cell stack generates an electric current equal to or greater than a predetermined electric current, the leak rate may be predetermined as a third rate that is less than the first rate. When the ratio of the difference between the supply amount of hydrogen and the consumption amount of hydrogen to the supply amount of hydrogen is equal to or greater than the third rate, the hydrogen leak may be determined to be insignificant.

The high output mode may be a mode in which the fuel cell stack generates an electric current equal to or greater than the predetermined electric current, and the predetermined current may be predetermined as a value approximate to half of a maximum output electric current. In the high output mode, both the supply amount of hydrogen supplied to the fuel cell stack and the consumption amount of hydrogen consumed in the fuel cell stack are substantial, and the ratio of the difference between the supply amount of hydrogen and the consumption amount of hydrogen to the supply amount of hydrogen is relatively minimal. Thus, the leak rate may be predetermined as the third rate which is less than the first rate, and in this case, the hydrogen leak may be determined to be insignificant.

The present invention may further include, after diagnosing the hydrogen supply state (S400), in response to detecting the hydrogen leak (S450), entering the emergency operation mode. The emergency operation mode may limit the load of the fuel cell or increase regenerative braking of a motor connected to the fuel cell (S500). In particular, the control for limiting the load of the fuel cell may be performed to limit the maximum rotation speed of the motor or the wheel in the case of a vehicle equipped with the fuel cell. Furthermore, the load of an air conditioner connected to the fuel cell may be reduced, and the vehicle may be switched to an ECO mode.

Additionally, the control for increasing regenerative braking of the motor connected to the fuel cell may be performed to increase the amount of regenerative braking of the motor during deceleration. According to such control, the fuel cell may be operated to stop electricity generation while ensuring the maximum driving distance of the fuel cell vehicle. Accordingly, the vehicle may move to a safe place to repair the hydrogen leak. In response to detecting that the hydrogen leak is insignificant, a warning lamp (or other type of notification such as a message) may be turned on to notify a user of this condition, and the control for limiting the load of the fuel cell or increasing regenerative braking of the motor connected to the fuel cell may not be performed.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A fuel cell hydrogen supply fault diagnosis method, comprising:
   opening, by a controller, a fuel tank valve disposed in each of multiple fuel tanks and configured to supply or shut off hydrogen of the fuel tanks;
   measuring, by the controller, pressure in a fuel supply line that extends from each of the multiple fuel tanks to be integrally connected to a fuel cell stack;
   estimating, by the controller, a supply amount of hydrogen supplied to the fuel cell stack based on the measured pressure in the fuel supply line and estimating a consumption amount of hydrogen consumed in a reaction in the fuel cell stack or discharged therefrom; and
   detecting, by the controller, a hydrogen supply state based on the estimated supply amount of hydrogen and consumption amount of hydrogen,
   wherein in estimating the supply amount of hydrogen and the consumption amount of hydrogen, a reaction amount consumed in the reaction in the fuel cell stack, a crossover amount cross from an anode side to a cathode side of the fuel cell stack, a purge amount purged from the fuel cell stack are added together and a value resulting from addition is estimated as the consumption amount of hydrogen, and
   wherein the reaction amount is estimated by cumulating an output electric current of the fuel cell stack over time, the crossover amount and the purge amount are cumulatively estimated over time based on an anode side hydrogen concentration of the fuel cell stack, and the anode side hydrogen concentration of the fuel cell stack is estimated in real time in consideration of crossover and purge based on an initial value.

2. The method of claim 1, wherein in estimating the supply amount of hydrogen and the consumption amount of hydrogen, the amount of hydrogen stored in the fuel tanks is calculated assuming that the measured pressure in the fuel supply line is pressure in the multiple fuel tanks, and an amount of change in the amount of stored hydrogen is estimated as the supply amount of hydrogen.

3. The method of claim 1, wherein when a ratio of a difference between the supply amount of hydrogen to the supply amount of hydrogen and the consumption amount of hydrogen is equal to or greater than a failure rate predetermined to be inversely proportional to the number of the fuel tanks, the method includes detecting that any one or more of the fuel tank valves have operationally failed.

4. The method of claim 3, further comprising:
   in response to detecting that any one or more of the fuel tank valves have operationally failed, determining which fuel tank valve has operationally failed by independently operating the fuel tank valves.

5. The method of claim 3, further comprising:
   after detecting that any one or more of the fuel tank valves have operationally failed, correcting, by the controller, a fuel fill amount or an available driving distance based on the number of fuel tank valves detected as having operationally failed; and
   entering, by the controller, an emergency operation mode to determine which fuel tank valve has operationally failed by independently operating the fuel tank valves.

6. The method of claim 1, wherein when a ratio of a difference between the supply amount of hydrogen and the consumption amount of hydrogen to the supply amount of hydrogen is equal to or greater than a leak rate predetermined according to an operation mode of a fuel cell, the method includes detecting a hydrogen leak.

7. The method of claim 6, wherein when the operation mode of the fuel cell is a power generation mode in which the fuel cell stack generates an electric current, the leak rate is predetermined as a first rate, and when the operation mode of the fuel cell is an initial mode within a predetermined interval from a point at which hydrogen supply to the fuel cell stack begins, the leak rate is predetermined as a second rate that is greater than the first rate.

8. The method of claim 7, wherein when the operation mode of the fuel cell is a high output mode in which the fuel cell stack generates an electric current equal to or greater than a predetermined electric current, the leak rate is predetermined as a third rate that is less than the first rate, and when the ratio of the difference between the supply amount of hydrogen and the consumption amount of hydrogen to the supply amount of hydrogen is equal to or greater than the third rate, the hydrogen leak is determined to be insignificant.

9. The method of claim 1, further comprising:
   after detecting that a hydrogen leak has occurred, entering, by the controller, an emergency operation mode to limit a load of the fuel cell or increase regenerative braking of a motor connected to the fuel cell.

* * * * *